(12) United States Patent
Taipale

(10) Patent No.: US 6,310,856 B1
(45) Date of Patent: Oct. 30, 2001

(54) CDMA COMMUNICATIONS SYSTEM HAVING A SEARCHER RECEIVER AND METHOD THEREFOR

(75) Inventor: Dana John Taipale, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/131,213

(22) Filed: Aug. 7, 1998

(51) Int. Cl.[7] .................. H04B 7/216; H04J 13/02; H04L 27/28
(52) U.S. Cl. ............... 370/208; 370/342; 375/142; 375/145; 375/149; 375/150
(58) Field of Search .................. 370/203, 206, 370/208, 209, 335, 342, 503, 516; 375/130, 140, 141, 142, 144, 145, 147, 148, 149, 150, 343, 354, 364, 367

(56) References Cited

U.S. PATENT DOCUMENTS

| | | | |
|---|---|---|---|
| 4,901,307 | 2/1990 | Gilhousen et al. | 370/18 |
| 5,109,390 | 4/1992 | Gilhousen et al. | 375/1 |
| 5,267,261 | * 11/1993 | Blakeney, II et al. | 375/1 |
| 5,528,624 | * 6/1996 | Kaku et al. | 375/206 |
| 5,544,167 | * 8/1996 | Lucas et al. | 370/18 |
| 5,602,833 | * 2/1997 | Zehavi | 370/209 |
| 5,640,414 | * 6/1997 | Blakeney, II et al. | 375/200 |
| 5,644,591 | 7/1997 | Sutton | 375/200 |
| 5,844,935 | * 12/1998 | Shoji | 375/200 |
| 5,974,038 | * 10/1999 | Shou et al. | 370/335 |

* cited by examiner

Primary Examiner—Alpus H. Hsu
(74) Attorney, Agent, or Firm—Daniel D. Hill; Paul J. Polansky

(57) ABSTRACT

A wideband CDMA handset (20) has a receiver (50) which simplifies initial sequence acquisition. The receiver (50) includes an efficient searcher receiver (54) which searches for long code mask sequences (LMS) using two correlators (80, 100). The searcher receiver (54) determines the complex conjugate of the output of the first correlator (80), and uses it to remove the phase ambiguity of the output of the second correlator (100). Thus the second correlator (100) is able to perform multiple correlations at the same time. The searcher receiver (54) coherently combines the output of the second correlator (100) to improve the reliability of the search decision.

20 Claims, 3 Drawing Sheets

CDMA COMMUNICATIONS SYSTEM HAVING A SEARCHER RECEIVER AND METHOD THEREFOR

FIELD OF THE INVENTION

This invention relates generally to communications systems, and more particularly, to searcher receivers for use in code division multiple access (CDMA) communications systems.

BACKGROUND OF THE INVENTION

Time division multiple access (TDMA), frequency division multiple access (FDMA), and code division multiple access (CDMA) are techniques which allow a communications system to accommodate a large number of system users. CDMA has recently been used in the United States for digital cellular telephone systems, and is being adopted for this purpose in other regions such as Japan and Europe through a variation of CDMA known as wideband CDMA (WCDMA). CDMA uses a spread spectrum modulation technique, in which the signal energy of each channel is spread over a wide frequency band, and in which multiple channels each corresponding to a different system user occupy the same frequency band. CDMA offers the advantage of efficient use of the available frequency spectrum, but at the cost of being computationally intensive.

In order to demodulate a received signal, a mobile CDMA receiver must identify and synchronize to a local base station in a timely manner. This process is known as acquisition. During acquisition, the mobile receiver determines the spreading code sequence and spreading code phase of a suitable base station. To make it easier for the mobile receiver to acquire the spreading code sequence and phase of the base station, the base station transmits several pilot signals. The pilot signals are helpers which allow the mobile receiver to more easily determine the spreading code sequence and spreading code phase. In order to synchronize to the base station, the mobile station selects a possible synchronization point and tests whether the signal energy using this synchronization point exceeds a threshold. This process is called hypothesis testing. The mobile receiver must perform hypothesis testing using different possible synchronization points until it finds one with a very high probability of being correct. The mobile receiver also continually searches for other base stations as call handoff candidates.

Thus acquisition in a mobile CDMA receiver requires many computations. These computations tend to decrease battery life. A searcher receiver which performs faster searches and therefore consumes less power would be desirable. Such a searcher receiver is provided by the present invention, whose features and advantages will be more clearly understood from the following detailed description taken in conjunction with the accompanying drawings.

DETAILED DESCRIPTION OF A PREFERRED EMBODIMENT

Figure 1:
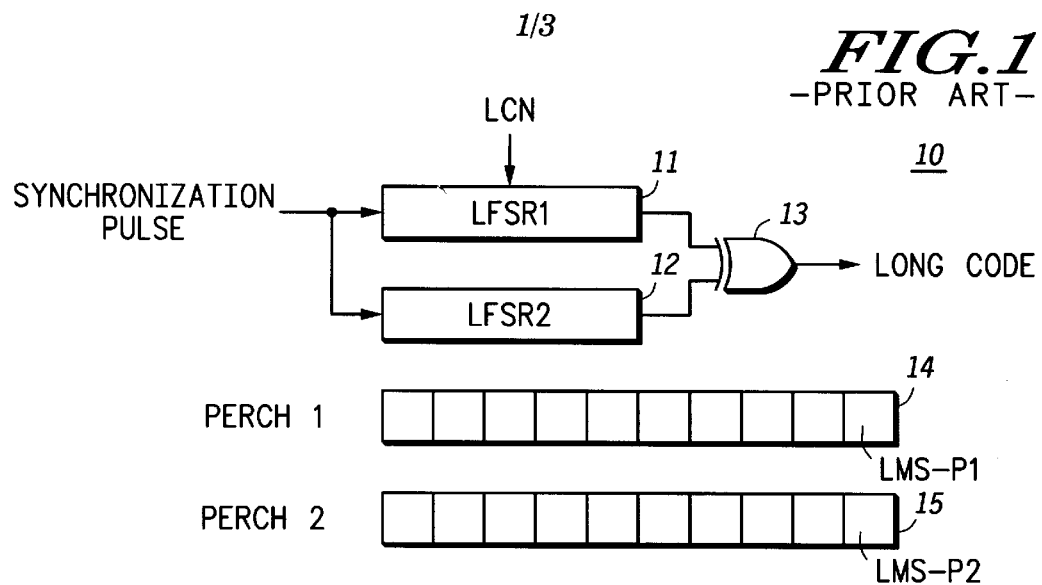
FIG. 1 illustrates, in partial block diagram and partial logic diagram form, a portion of a wideband code division multiple access (WCDMA) base station transmitter known in the prior art.

FIG. 1 illustrates, in partial block diagram and partial logic diagram form, a portion of a wideband code division multiple access (WCDMA) base station transmitter 10 known in the prior art. Transmitter 10 includes circuitry for generating the spreading code sequence having a particular spreading code phase, and pilot signals for use by a mobile receiver in acquisition. More specifically, transmitter 10 includes a first linear feedback shift register (LFSR) 11 labelled "LFSR1", a second LFSR 12 labelled "LFSR2", and an exclusive-OR (XOR) gate 13. Also shown in FIG. 1 is a first pilot signal 14 labelled "PERCH 1" and a second pilot signal 15 labelled "PERCH 2". In transmitter 10, transmission is synchronized with a signal labeled "SYNCHRONIZATION PULSE". LFSR 11 has a first input for receiving the SYNCHRONIZATION PULSE, a second input for receiving a long code number (LCN), and an output. LFSR 12 includes a first input for receiving the SYNCHRONIZATION PULSE, and an output. XOR gate 13 has a first input connected to the output of LFSR 11, a second input connected to the output of LFSR 12, and an output for providing a signal labeled "LONG CODE".

Pilot signal 14 includes ten portions each having 256 bits, known as "chips". The first nine portions correspond to the LONG CODE, and the last portion is a special spreading sequence labelled "LMS-P1". Pilot signal 15 also includes ten portions each having 256 chips. The first nine are not transmitted, but the last is a special spreading sequence labelled "LMS-P2".

To acquire synchronization in WCDMA without PERCH1 and PERCH 2, a mobile receiver would have to search 40,960 possible spreading code phases for a match with one of 128 possible spreading code sequences. Thus the worst case number of trials would equal 40,960 times 128. At a 4.096 megachip/second (Mc/s) rate, this technique would require either an excessive search time, or a large amount of hardware circuitry to perform many searches in parallel.

Instead, a WCDMA base station transmits PERCH 1 and PERCH 2 as helpers. A mobile receiver could start acquisition by searching for the LMS-P1 sequence, which is easier because there are only 2560 possible LMS-P1 code phases. After finding the code phase of LMS-P1, the mobile receiver could search at the same phase for one of four possible LMS-P2 code sequences. Each of the LMS-P2 code sequences is used with 32 of the 128 LONG CODE sequences. Thus, the 128 possible code sequences have been reduced to 32, and the 40,960 possible code phases have been reduced to 16. While WCDMA thus offers computational advantages in acquisition, further improvement would be desirable.

Figure 2:
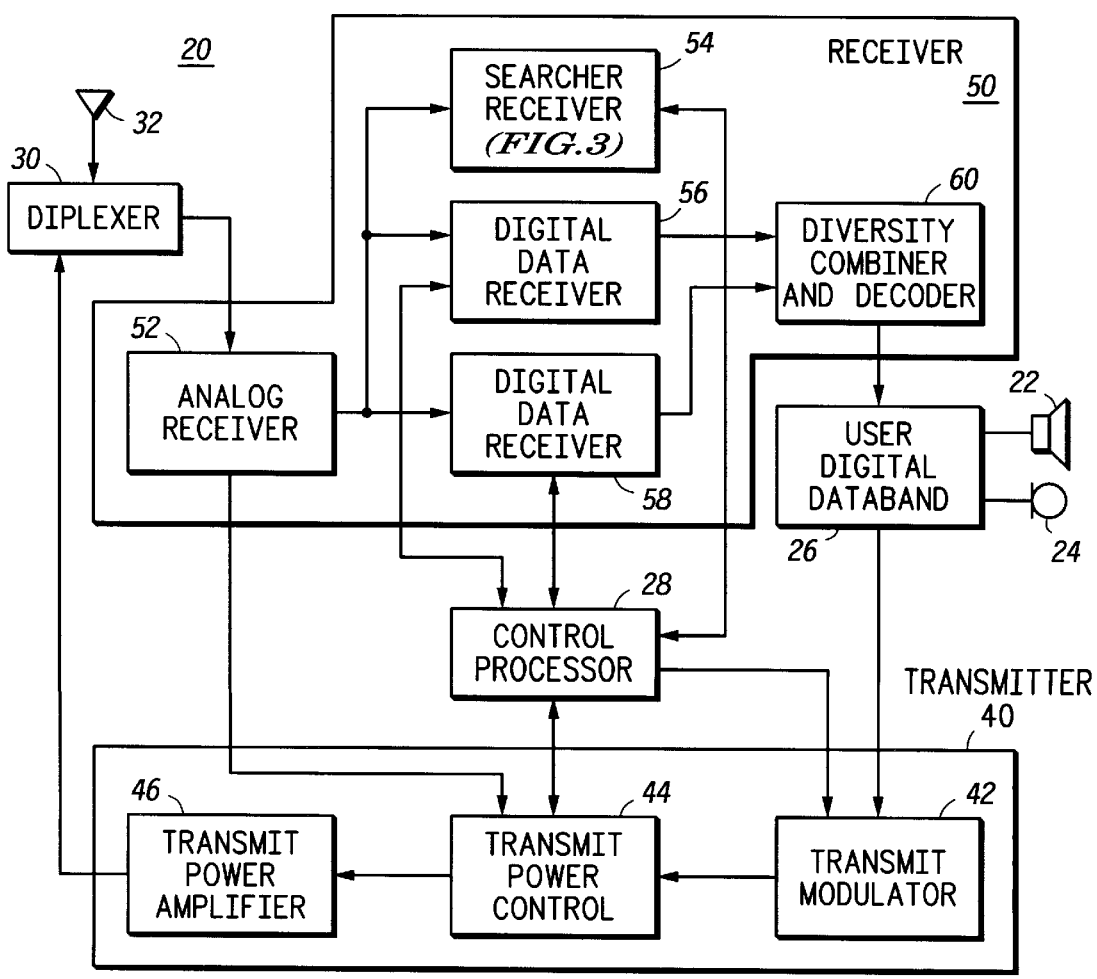
FIG. 2 illustrates, in partial block diagram and partial schematic form, a WCDMA handset having a searcher receiver according to the present invention.

FIG. 2 illustrates, in partial block diagram and partial schematic form, a WCDMA handset 20 according to the present invention. Handset 20 includes an antenna 32 which is coupled through diplexer 30 to an analog receiver 52 and transmit power amplifier circuitry 46. Antenna 32 and diplexer 30 are of standard design and permit simultaneous transmission and reception through a single antenna. Antenna 32 collects transmitted signals and provides them through diplexer 30 to analog receiver 52. Analog receiver 52 receives the radio (RF) frequency signals from diplexer 30 which are typically in the 850 megahertz (MHz) frequency band, or in the 1.8 or 1.9 gigahertz frequency bands, for amplification and frequency down conversion to an intermediate (IF) frequency. This translation process is accomplished using a frequency synthesizer of standard design which permits the receiver to be tuned to any of the frequencies within the receive frequency band of the overall cellular telephone frequency band.

The IF signal is then passed through a surface acoustic wave (SAW) bandpass filter which in the preferred embodiment is approximately 5.0 MHz in bandwidth. The characteristics of the SAW filter are chosen to match the waveform of the signal transmitted by the cell-site which has been direct sequence spread spectrum modulated by a positive-negative (PN) sequence clocked at a predetermined rate, which in the preferred embodiment is 4.096 MHz.

Analog receiver 52 also performs a power control function for adjusting the transmit power of handset 20. Analog receiver 52 generates an analog power control signal that is provided to transmit power control circuitry 44. Analog receiver 52 is also provided with an analog to digital (A/D) converter (not shown) for converting the IF signal to a digital signal with conversion occurring at a 32,768 MHz clock rate in the preferred embodiment which is exactly eight times the PN chip rate. The digitized signal is provided to each of two or more signal processors or data receivers, one of which is a CDMA searcher receiver with the remainder being data receivers.

In FIG. 2, the digitized signal output from analog receiver 52 is provided to digital data receivers 56 and 58 and to CDMA searcher receiver 54. It should be understood that an inexpensive, low performance mobile unit might have only a single data receiver while higher performance units may have two or more to allow for diversity reception.

The digitized IF signal may contain the signals of many on-going calls together with the pilot carriers transmitted by the current and all neighboring cell-sites. The function of digital data receivers 56 and 58 is to correlate the IF samples with the proper PN sequence. This correlation process provides a property that is well-known in the art as "processing gain" which enhances the signal-to-interference ratio of a signal matching the proper PN sequence while not enhancing other signals. Correlation output is then synchronously detected using the pilot carrier from the closest cell-site as a carrier phase reference. The result of this detection process is a sequence of encoded data symbols.

A property of the PN sequence as used in handset 20 is that discrimination is provided against multi-path signals. When the signal arrives at the mobile receiver after passing through more than one path, there will be a difference in the reception time of the signals. This reception time difference corresponds to the difference in distance divided by the speed of light. If this time difference exceeds one fourth of a microsecond, then the correlation process will discriminate against one of the paths. The data receiver can choose whether to track and receive the earlier or later path. If two or more data receivers are provided, such as digital data receivers 56 and 58, then two independent paths can be tracked and in parallel.

Searcher receiver 54, under control of control processor 28, is for continuously scanning the time domain around the nominal time of a received pilot signal of the cell-site for other multipath pilot signals from the same cell-site and for other cell-site transmitted pilot signals. Searcher receiver 54 will measure the strength of any reception of a desired waveform at times other than the nominal time. Searcher receiver 54 compares signal strength in the received signals. Searcher receiver 54 provides a signal strength signal to control processor 28 indicative of the strongest signals and relative time relationship.

Control processor 28 provides signals to control digital data receivers 56 and 58 for each to process a different one of the strongest signals. On occasion, another cell-site transmitted pilot signal is of greater signal strength than the current cell-site signal strength. Control processor 28 would then generate a control message for transmission to the system controller via the current cell-site requesting a transfer of the call to the cell-site corresponding to the stronger pilot signal. Digital data receivers 56 and 58 may therefore handle calls through two different cell-sites.

The outputs of digital data receivers 56 and 58 are provided to diversity combiner and decoder circuitry 60. The diversity combiner circuitry contained within diversity combiner and decoder circuitry 60 simply adjusts the timing of the two streams of received signals into alignment and adds them together. This addition process may be proceeded by multiplying the two streams by a number corresponding to the relative signal strengths of the two streams. This operation can be considered a maximal ratio diversity combiner. The resulting combined signal stream is then decoded using a forward stream error detection decoder also contained within diversity combiner and decoder circuitry 60.

In the exemplary embodiment convolutional encoding is utilized. The convolutional encoding has a constraint length of 9 and a code rate of ⅓, i.e. three encoded symbols are produced and transmitted for every information bit to be transmitted. The optimum decoder for this type of code is of the soft decision Viterbi algorithm decoder design. The resulting decoded information bits are passed to user digital databand circuitry 26.

User digital databand circuitry 26 typically includes a digital vocoder (not shown). User digital databand circuitry 26 further serves as an interface with a loudspeaker 22 and a microphone 24 to form a cellular handset. User digital databand circuitry 26 accommodates a variety of different vocoder designs. User digital databand circuitry 26 provides output information signals to the user in accordance with the information provided thereto from diversity combiner and decoder circuitry 60.

User analog voice signals received from a microphone 24 in handset 20 are provided as an input to user digital databand circuitry 26. User digital databand circuitry 26 includes an analog to digital (A/D) converter (not shown) which converts the analog signal to digital form. The digital signal is provided to the digital vocoder where it is encoded. The vocoder output is provided to a forward error correction encoding circuit (not shown) for error correction. This voice encoded digitized voice signal is output from user digital databand circuitry 26 to transmit modulator 42.

Transmit modulator 42 modulates the encoded signal on a PN carrier signal whose PN sequence is chosen according to the assigned address function for the call. The PN sequence is determined by control processor 28 from call setup information that is transmitted by the cell-site and demodulated by digital data receivers 56 and 58. In the alternative, control processor 28 may determine the PN sequence through pre-arrangement with the cell-site. Control processor 28 provides the PN sequence information to transmit modulator 42 and to digital data receivers 56 and 58 for call decoding. The output of transmit modulator 42 is provided to transmit power control circuitry 44. Signal transmission power is controlled by the analog power control signal provided from analog receiver 52. Control bits are transmitted by the cell-sites in the form of a power adjustment command and are processed by digital data receivers 56 and 58. The power adjustment command is used by control processor 28 in setting the power level in mobile unit transmission. In response to this command, control processor 28 generates a digital power control signal that is provided to transmit power control circuitry 44.

Transmit power control circuitry 44 outputs the power controlled modulated signal to transmit power amplifier circuitry 46. Transmit power amplifier circuitry 46 amplifies and converts the IF signal to an RF frequency by mixing with a frequency synthesizer output signal which tunes the signal to the proper output frequency. Transmit power amplifier circuitry 46 includes an amplifier which amplifies the power to a final output level. The intended transmission signal is output from transmit power amplifier circuitry 46 to diplexer 30. Diplexer 30 couples the signal to antenna 32 for transmission to the cell-sites.

Control processor 28 also is capable of generating control messages such as cell-diversity mode requests and cell-site communication termination commands. These commands are provided to transmit modulator 42 for transmission. Control processor 28 is responsive to the data received from digital data receivers 56 and 58 and searcher receiver 54 for making decisions relative to handoff and diversity combining.

Figure 3:
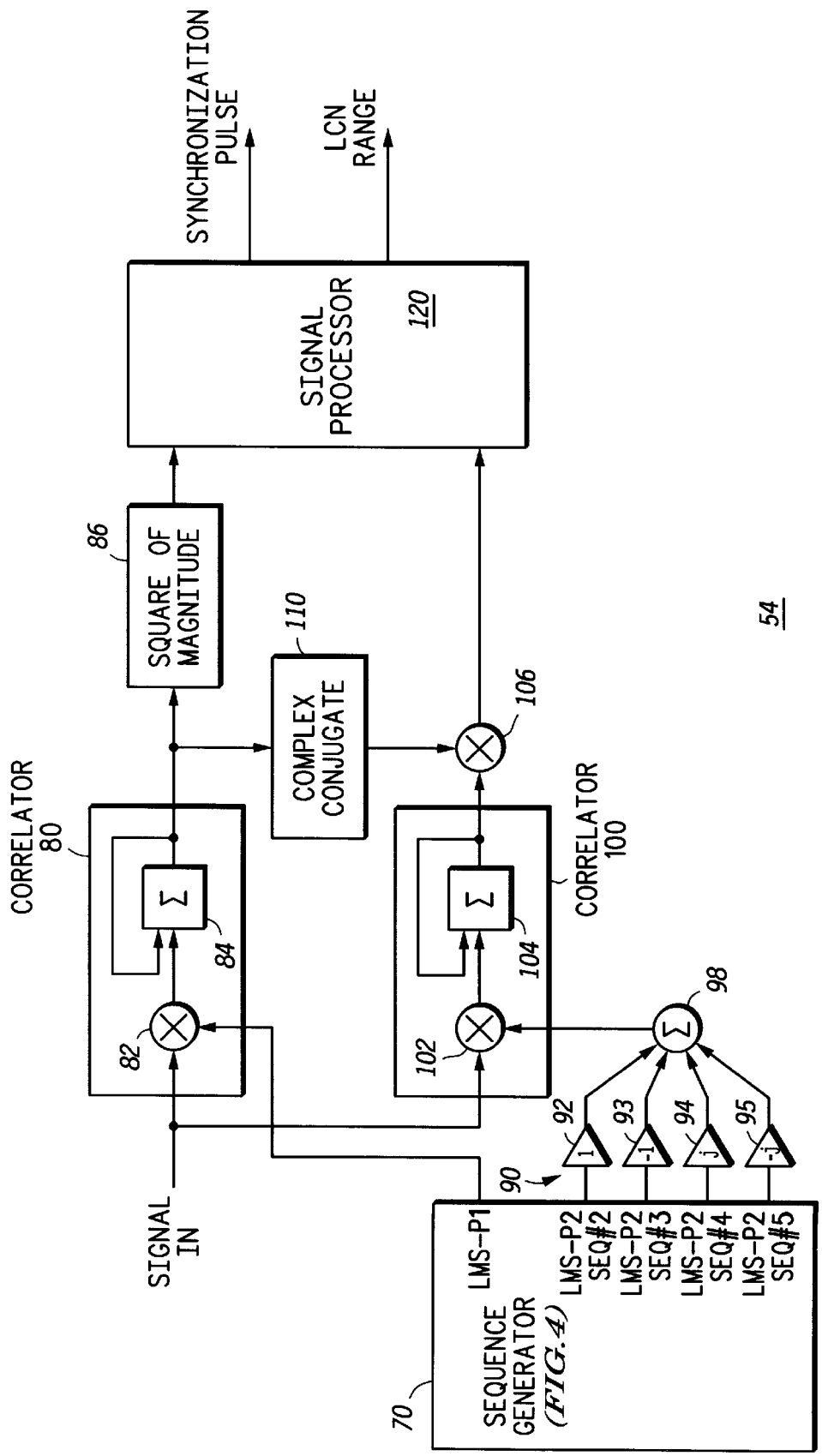
FIG. 3 illustrates, in partial block diagram and partial logic diagram form, the searcher receiver of FIG. 2.

FIG. 3 illustrates in partial block diagram and partial logic diagram form searcher receiver 54 of FIG. 2. Searcher receiver 54 includes a sequence generator 70, a correlator 80, a square of magnitude block 86, a multiplication portion 90, a summing device 98, a correlator 100, a multiplier 106, a complex conjugate block 110, and a signal processor 120. Sequence generator 70 provides five output sequences of complex numbers labeled "LMS-P1", "LMS-P2 SEQ #2", "LMS-P2 SEQ #3", "LMS-P2 SEQ #4", and "LMS-P2 SEQ #5", of which LMS-P1 is the LMS sequence for PERCH 1, and LMS-P2 SEQ #N are the four possible LMS sequences for PERCH 2.

Correlator 80 includes generally a multiplier 82 and a summing device 84. Multiplier 82 has a first input for receiving a signal labelled "SIGNAL IN", a second input connected to the LMS-P1 output of sequence generator 70, and an output. Summing device 84 has a first input, a second input connected to the output of multiplier 82, and an output connected to the first input thereof. Square of magnitude block 86 has an input connected to the output of summing device 84, and an output.

Multiplication portion 90 includes complex number multipliers 92–95. Multiplier 92 has an input connected to the LMS-P2 SEQ #2 output of sequence generator 70, and an output, and performs a multiplication of the input by the value of +1 to provide the output thereof. Multiplier 93 has an input connected to the LMS-P2 SEQ #3 output of sequence generator 70, and an output, and multiplies the input thereof by a value of −1 to provide the output thereof. Multiplier 94 has an input connected to the LMS-P2 SEQ #4 output of sequence generator 70, and an output, and multiplies the input thereof by a value of j to provide the provide the output thereof. Multiplier 95 has an input connected to the LMS-P2 SEQ #5 output of sequence generator 70, and an output, and multiplies the input thereof by the value of −j to provide the output thereof. Summing device 98 has a first input connected to the output of multiplier 92, a second input connected to the output of multiplier 93, a third input connected to the output of multiplier 94, a fourth input connected to the output of multiplier 95, and an output.

Correlator 100 includes a multiplier 102 and a summing device 104. Multiplier 102 has a first input for receiving SIGNAL IN, a second input connected to the output of summing device 98, and an output. Summing device 104 has a first input, a second input connected to the output of multiplier 102, and an output connected to the first input thereof.

Multiplier 106 has a first input connected to the output of summing device 104, a second input, and an output. Complex conjugate block 110 has an input connected to the output of summing device 84, and an output connected to the second input of multiplier 106. Signal processor 120 has a first input connected to the output of square of magnitude block 86, a second input connected to the output of multiplier 106, a first output for providing the SYNCHRONIZATION PULSE, and a second output for providing a long code number (LCN) signal labelled "LCN RANGE". The LCN RANGE indicates which of a plurality of spreading sequences has a largest correlation to the input signal.

In operation, searcher receiver 54 includes circuitry to determine the spreading code phase used for LMS-P1 and the spreading code sequence used for LMS-P2. To test a particular hypothesis (i.e., test a particular spreading code phase), sequence generator 70 generates the 256-chip sequence for LMS-P1 and the corresponding set of four 256-chip sequences for LMS-P2. Multiplication portion 90 multiples each the spreading sequences by a predetermined separate distinct phase angle, and in the illustrated embodiment, places the four phase shifted sequences used for LMS-P2 in quadrature with respect to each other. Summing device 98 sums these quadrature signals to produce a spreading sequence to be input to multiplier 102 of correlator 100. The resulting spreading sequence provides a correlation of the LMS-P2 sequences with SIGNAL IN. At the same time, correlator 80 correlates SIGNAL IN with the LMS-P1 sequence.

The output of correlator 80 is input to complex conjugate block 110, and the output thereof is input to multiplier 106. Multiplier 106 multiplies the output of correlator 100 times the conjugate to produce an output that is independent of the phase of SIGNAL IN. Thus, searcher receiver 54 uses the output of correlator 80 to remove a phase offset from the output of correlator 100. Hence the phase of the output of multiplier 106 can be used to determine which of the four LMS-P2 sequences correlates with SIGNAL IN. In this manner searcher receiver 54 uses one correlator circuit to perform four correlations. The SYNCHRONIZATION PULSE is provided by signal processor 120 as a result of a predetermined favorable relationship between a squared magnitude correlated output signal from the square of magnitude block 86 and an output signal that is independent of the phase of the input signal from multiplier 106. The SYNCHRONIZATION PULSE is used to identify a beginning of a time slot of a plurality of time slots to reduce a time required to synchronize the handset to the basestation.

Square of magnitude block 86 is used to determine the power in SIGNAL IN by squaring the absolute value of the output of correlator 80. This operation is necessary because there is no phase reference for SIGNAL IN. However, use of square of magnitude block 86 reduces the signal to noise ratio (SNR) of the result by 3 decibels (dB). The SNR of the result can be improved by averaging the output of square of magnitude block 86 over several time slots to yield a more reliable prediction. However searcher receiver 54 improves the SNR of the output of correlator 100 by multiplying this output by the complex conjugate of the output of correlator 80. This additional operation "de-spins" the result, i.e., aligns the complex result to the axes. Thus the phase ambiguity does not need to be removed by magnitude squaring and the SNR of the estimate is better.

Figure 4:
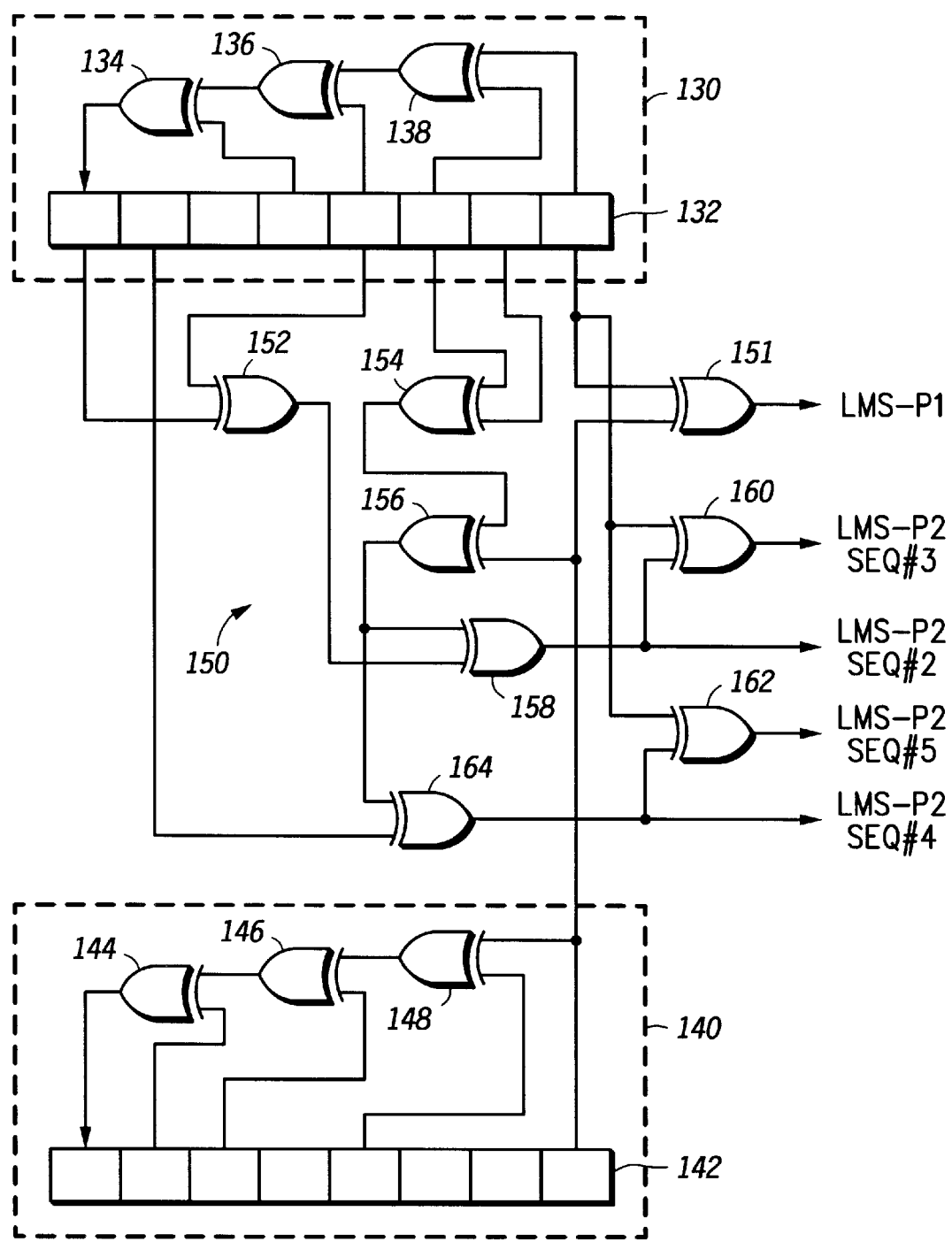
FIG. 4 illustrates, in partial block diagram and partial logic diagram form, the sequence generator of FIG. 3.

FIG. 4 illustrates, in partial block diagram and partial logic diagram form, sequence generator 70 of FIG. 3. Sequence generator 70 includes generally a first LFSR 130, a second LFSR 140, and a logic circuit block 150. LFSR 130 includes generally a shift register 132 and exclusive-OR (XOR) gates 134, 136, and 138. Shift register 132 is an 8-bit shift register in which an output of a bit is connected to an input of a subsequent bit. To form the LFSR pattern, the outputs of bits 4, 5 and 6 are also provided to the first inputs of XOR gates 134, 136, and 138 respectively. XOR gate 138 also has a second input connected to the output of bit 8 of shift register 132, and an output. XOR gate 136 also has a second input connected to the output of XOR gate 138 and an output. XOR gate 134 also has a second input connected to the output of XOR gate 136 and an output connected to the input of the first bit position of shift register 132.

LFSR 140 includes generally a shift register 142 and XOR gates 144, 146, and 148. Shift register 142 is an 8-bit shift register in which an output of a bit is connected to an input of a subsequent bit. In addition, the outputs of bit positions 2, 3, and 5 are provided to a first input terminal of XOR gates 144, 146, and 148, respectively. XOR gate 148 also has a second input connected to the output of the eighth bit position of shift register 142 and an output. XOR gate 146 has a second input connected to the output of XOR gate 148 and an output. XOR gate 144 has a second input connected to the output of XOR gate 146 and an output connected to the input of the first bit position of shift register 142.

Logic circuit block 150 includes XOR gates 151, 152, 154, 156, 158, 160, 162, and 164. XOR gate 151 has a first input connected to the eighth bit position of shift register 132, a second input connected to the eighth bit position of shift register 142, and an output for providing signal LMS-P1. XOR gate 152 has a first input connected to the first bit position of shift register 132, a second input connected to the fifth bit position of shift register 132, and an output. XOR gate 154 has a first input connected to the sixth bit position of shift register 132, a second input connected to the seventh bit position of shift register 132, and an output. XOR gate 156 has a first input connected to the output of XOR gate 154, a second input connected to the eighth bit position of shift register 142 and an output. XOR gate 158 has a first input connected to the output of XOR gate 156, a second input connected to the output of XOR gate 152, and an output for providing signal LMS-P2 SEQ#2. XOR gate 160 has a first input connected to the eighth bit of shift register 132, a second input connected to the output of XOR gate 158 and an output for providing signal LMS-P2 SEQ#3. XOR gate 162 has a first input connected to the eighth bit position of shift register 132, a second input, and an output for providing signal LMS-P2 SEQ#5. XOR gate 164 has a first input connected to the second bit position of shift register 132, a second input connected to the output of XOR gate 156, and an output connected to the second input of XOR gate 162 for providing signal LMS-P2 SEQ#4.

Sequence generator 70 efficiently generates LMS sequences for use in searcher receiver 54. The is done by using one of the linear feedback shift registers to generate a first pseudo random sequence, and using the other linear feedback shift register to generate a second pseudo random sequence. The first and second pseudo random sequences are exclusive ORed to provide a spreading sequence. Logic circuit block 150 and shift registers 132 and 142 are used to generate a plurality of spreading sequences.

Sequence generator 70 includes only two LFSRs to generate five LMS codes by using the property of LFSRs in which any phase of the LFSR can be obtained by XORing the correct subset of the LFSR state values. Sequence generator 70 thus reduces the integrated circuit area required for searcher receiver 54.

While the invention has been described in the context of a preferred embodiment, it will be apparent to those skilled in the art that the present invention may be modified in numerous ways and may assume many embodiments other than that specifically set out and described above. For example, the searcher receiver may be implemented completely in hardware, completely in software, or with various combinations thereof. Accordingly, it is intended by the appended claims to cover all modifications of the invention which fall within the scope of the invention.

I claim:

1. A CDMA searcher receiver, comprising:
   a first correlator having a first input for receiving an input signal having a phase, a second input for receiving a first spreading sequence, and an output that provides a first correlation of the input signal with the first spreading sequence;
   a second correlator having a first input for receiving the input signal, a second input for receiving a second spreading sequence and an output that provides a second correlation of the input signal with the second spreading sequence;
   a circuit block having an input coupled to the output of the first correlator, and an output for providing a complex conjugate of the first correlation; and
   a multiplier having a first input coupled to the output of the circuit block, a second input coupled to the output of the second correlator, and an output for providing a multiplier output signal that is independent of the phase of the input signal.

2. The CDMA searcher receiver of claim 1, further comprising:
   a sequence generator for generating the first spreading sequence and a plurality of other spreading sequences.

3. The CDMA searcher receiver of claim 2, further comprising:
   a second circuit block for multiplying each of the plurality of other spreading sequences by a separate distinct phase to produce a plurality of phase shifted spreading sequences; and
   a summing element for combining the plurality of phase shifted spreading sequences to produce the second spreading sequence.

4. The CDMA searcher receiver of claim 2, wherein the sequence generator comprises:
   a first linear feedback shift register for generating a first pseudo random sequence;
   a second linear feedback shift register for generating a second pseudo random sequence; and
   a logic block for performing an exclusive OR logic function on the first and second pseudo random sequences to provide the first spreading sequence.

5. The CDMA searcher receiver of claim 4, wherein the sequence generator further comprises a plurality of logic blocks for selectively coupling the first and second linear feedback shift registers to produce the plurality of other spreading sequences.

6. The CDMA searcher receiver of claim 1, further comprising a square of magnitude block having an input coupled to the output of the first correlator, and an output for providing an output that is a squared magnitude of the first correlation.

7. The CDMA searcher receiver of claim 6, further comprising a signal processor having a first input coupled to the output of the square of magnitude block, a second input coupled to the output of the multiplier, a first output for providing a synchronization pulse if the multiplier output signal and the output that is the squared magnitude of the first correlation favorably conform to a predetermined relationship, and a second output for providing a long code number that indicates which of a plurality of spreading sequences has a largest correlation to the input signal.

8. The CDMA searcher receiver of claim 1, wherein the CDMA searcher receiver is a portion of a cellular telephone handset.

9. A CDMA cellular telephone handset, comprising:
   a receiver having an input terminal for receiving an input signal, and an output terminal for providing a baseband input signal;
   a searcher receiver having an input terminal for receiving the baseband input signal, the searcher receiver for performing multiple substantially simultaneous correlations with a plurality of phase shifted spreading sequences used to synchronize the CDMA cellular telephone handset to a basestation spreading sequence for identifying the basestation;
   a data receiver having an input terminal coupled to the output terminal of the receiver for receiving the baseband input signal, and having an output terminal for providing demodulated data; and
   a control processor, coupled to the receiver, the searcher receiver, and the data receiver, the control processor for controlling operation of the receiver, the searcher receiver, and the data receiver.

10. The CDMA cellular telephone handset of claim 9, wherein the searcher receiver comprises:
   a first correlator having a first input for receiving the baseband input signal, the baseband input signal having a phase, a second input for receiving a first spreading sequence, and an output that provides a first correlation of the baseband input signal with the first spreading sequence;
   a second correlator having a first input for receiving the baseband input signal, a second input for receiving a second spreading sequence and an output that provides a second correlation of the baseband input signal with the second spreading sequence;
   a circuit block having an input coupled to the output of the first correlator, and an output for providing a complex conjugate of the first correlation; and
   a multiplier having a first input coupled to the output of the circuit block, a second input coupled to the output of the second correlator, and an output for providing a multiplier output signal that is independent of the phase of the baseband input signal.

11. The CDMA cellular telephone handset of claim 10, further comprising:

a sequence generator for generating the first spreading sequence and a plurality of other spreading sequences.

12. The CDMA cellular telephone handset of claim 11, further comprising:
   a second circuit block for multiplying each of the plurality of other spreading sequences by a separate distinct phase to produce a plurality of phase shifted spreading sequences; and
   a summing element for combining the plurality of phase shifted spreading sequences to produce the second spreading sequence.

13. The CDMA cellular telephone handset of claim 10, further comprising a square of magnitude block having an input coupled to the output of the first correlator, and an output for providing an output that is a squared magnitude of the first correlation.

14. The CDMA cellular telephone handset of claim 13, further comprising a signal processor having a first input coupled to the output of the square of magnitude block, a second input coupled to the output of the multiplier, a first output for providing a synchronization pulse if the multiplier output signal and the output that is the squared magnitude of the first correlation favorably conform to a predetermined relationship, and a second output for providing a long code number that indicates which of a plurality of spreading sequences has a largest correlation to the input signal.

15. In a CDMA communications system, a method for synchronizing a handset to a basestation spreading sequence, the method comprising the steps of:
   receiving an input signal;
   correlating the input signal with a first spreading sequence to produce a first correlated output signal;
   generating a plurality of other spreading sequences;
   changing a phase angle of each of the plurality of other spreading sequences to a predetermined distinct phase angle to produce a plurality of phase shifted spreading sequences;
   summing the plurality of phase shifted spreading sequences to produce a second spreading sequence;
   correlating the input signal with the second spreading sequence to produce a second correlated output signal;
   multiplying the second correlated output signal with a conjugate of the first correlated output signal to produce an output signal that is independent of a phase of the input signal;
   squaring a magnitude of the first correlated output signal to produce a squared magnitude first correlated output signal; and
   providing a synchronization pulse as a result of a favorable relationship between the squared magnitude first correlated output signal and the output signal that is independent of the phase of the input signal, wherein the synchronization pulse is used to identify a beginning of a time slot of a plurality of time slots to reduce a time required to synchronize the handset to the basestation.

16. The method of claim 15, wherein the step of changing a phase angle of each of the plurality of other spreading sequences comprises changing the phase angle of each of the plurality of other spreading sequences to equal size phase angles relative to each other.

17. The method of claim 15, wherein the step of providing a synchronization pulse further comprises providing a long code number that indicates which of a plurality of spreading sequences has a largest correlation to the input signal.

18. The method of claim 15, further comprising the steps of:
generating a first pseudo random sequence using a first linear feedback shift register;
generating a second pseudo random sequence using a second linear feedback shift register; and
exclusive ORing the first and second pseudo random sequences to provide the first spreading sequence.

19. The method of claim 18, further comprising the steps of selectively exclusive ORing the first and second linear feedback shift registers together to produce the plurality of other spreading sequences.

20. The method of claim 15, further comprising the step of accumulating, over multiple time slots, the output signal that is independent of a phase of the input signal to more accurately determine when to provide the synchronization pulse.

* * * * *